United States Patent
Miyazaki

(10) Patent No.: US 10,622,133 B2
(45) Date of Patent: Apr. 14, 2020

(54) COIL COMPONENT

(71) Applicant: SUMIDA CORPORATION, Chuo-ku, Tokyo (JP)

(72) Inventor: Hiroyuki Miyazaki, Natori (JP)

(73) Assignee: SUMIDA CORPORATION (JP)

( * ) Notice: Subject to any disclaimer, the term of this patent is extended or adjusted under 35 U.S.C. 154(b) by 114 days.

(21) Appl. No.: 15/861,883

(22) Filed: Jan. 4, 2018

(65) Prior Publication Data
US 2018/0218821 A1 Aug. 2, 2018

(30) Foreign Application Priority Data
Feb. 1, 2017 (JP) ................. 2017-017076

(51) Int. Cl.
| | |
|---|---|
| H01F 17/04 | (2006.01) |
| H01F 17/00 | (2006.01) |
| H01F 5/04 | (2006.01) |
| H01F 17/06 | (2006.01) |
| H01F 41/06 | (2016.01) |
| H02K 3/52 | (2006.01) |
| H02K 3/34 | (2006.01) |
| H01F 27/34 | (2006.01) |
| H01F 3/14 | (2006.01) |
| H01F 27/26 | (2006.01) |

(52) U.S. Cl.
CPC .......... *H01F 17/0013* (2013.01); *H01F 3/14* (2013.01); *H01F 5/04* (2013.01); *H01F 17/0033* (2013.01); *H01F 17/06* (2013.01); *H01F 27/346* (2013.01); *H01F 41/06* (2013.01); *H02K 3/34* (2013.01); *H02K 3/522* (2013.01); *H01F 27/263* (2013.01)

(58) Field of Classification Search
USPC ................................. 336/212, 221
See application file for complete search history.

(56) References Cited

U.S. PATENT DOCUMENTS 2,909,742 A * 10/1959 Lamberton ............ H01F 27/25
336/210
2012/0200382 A1 8/2012 Hejny

FOREIGN PATENT DOCUMENTS

| EP | 2775488 A1 | 9/2014 |
|---|---|---|
| JP | H09-153416 A | 6/1997 |
| JP | 2006-066847 A | 3/2006 |
| JP | 2008-021948 A | 1/2008 |
| JP | 2010-147075 A | 7/2010 |

OTHER PUBLICATIONS

Extended European Search Report for European Application No. 18153786.1, dated Jun. 27, 2018 (8 pages).

\* cited by examiner

*Primary Examiner* — Ronald Hinson
(74) *Attorney, Agent, or Firm* — Harness, Dickey & Pierce, P.L.C.

(57) ABSTRACT

A coil component includes a core; and a coil wound around the core, in which the core is configured to include plural split cores arranged linearly alongside each other in an axial-center direction of the coil, and an intervening layer made out of a non-magnetic material (for example, comprised of an insulating coating) is disposed between split cores adjacent to each other of the plural split cores.

4 Claims, 10 Drawing Sheets

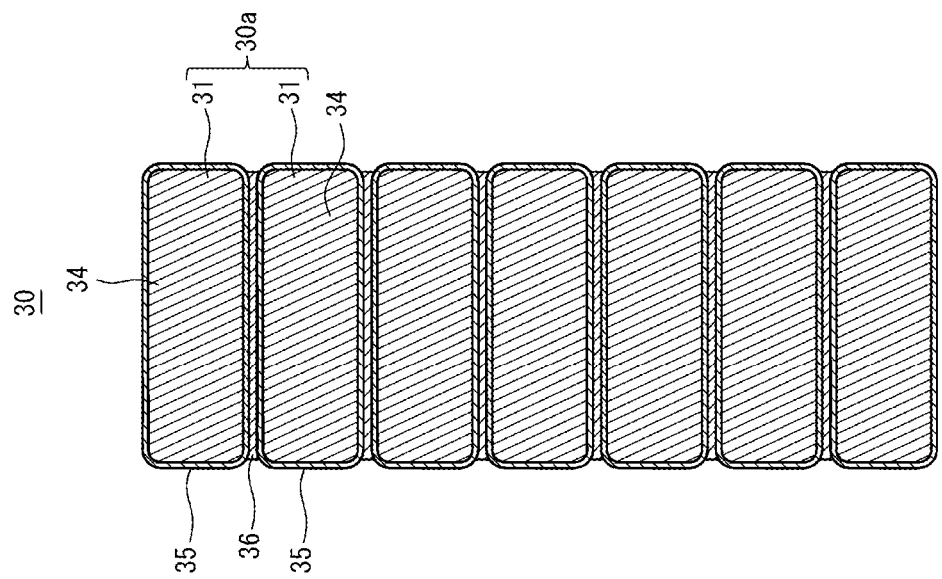
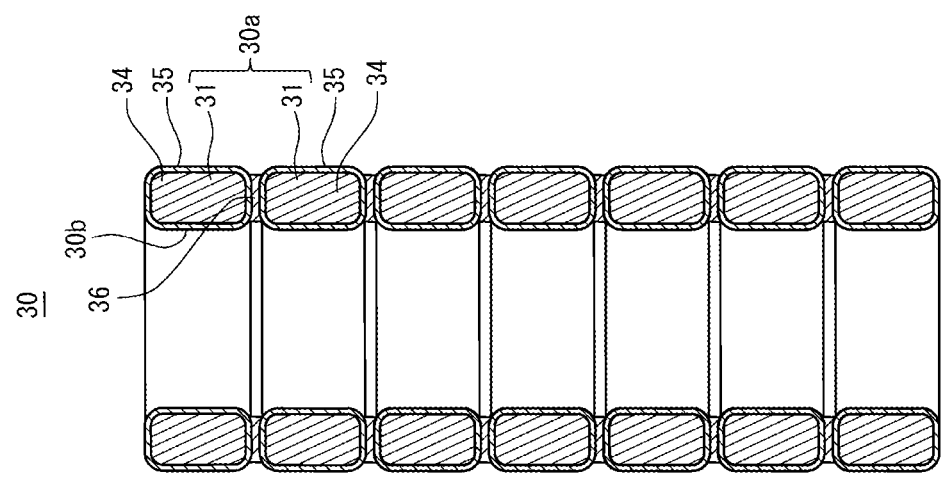

COIL COMPONENT

TECHNICAL FIELD

The present invention relates to coil components.

BACKGROUND ART

There is known a coil component including a rod-shaped core and a coil wound around the core (for example, Japanese Patent Application Laid-open No. 2006-66847).

SUMMARY OF THE INVENTION

According to the present invention, there is provided a coil component including:

a core; and a coil wound around the core, in which the core is configured to include a plurality of split cores arranged linearly alongside each other in an axial-center direction of the coil, and an intervening layer made out of a non-magnetic material is disposed between split cores adjacent to each other of the plurality of split cores.

According to the present invention, it is possible to reduce alternating-current resistance and achieve sufficient quality factors.

BRIEF DESCRIPTION OF THE DRAWINGS

FIG. 10A is a front sectional view illustrating a core that a coil component according to a modification example of the first exemplary embodiment includes, and FIG. 10B is a front sectional view illustrating a core that a coil component according to a modification example of the second exemplary embodiment includes.

DESCRIPTION OF EMBODIMENTS

Figure 1:
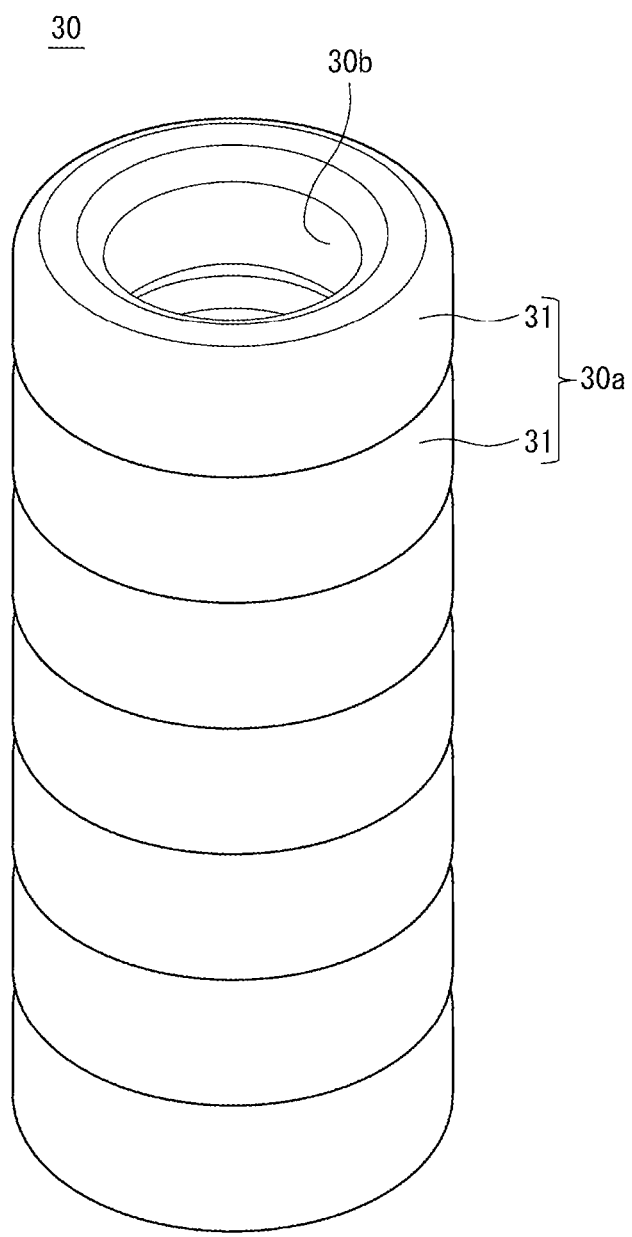
FIG. 1 is a perspective view illustrating a core that a coil component according to a first exemplary embodiment includes.

As a result of studies made by the present inventor, there is a possibility that, with the coil component having the structure as described in Japanese Patent Application Laid-open No. 2006-66847, a large loss of electric power resulting from alternating-current resistance happens, and adequate quality factors cannot be obtained.

The present invention has been made in view of the problem described above, and is to provide a coil component having a structure that can reduce alternating-current resistance and achieve sufficient quality factors.

The above and other objects, advantages and features of this invention will be more apparent from the following description of certain preferred embodiments taken in conjunction with the accompanying drawings.

Hereinbelow, exemplary embodiments according to the present invention will be described with reference to the drawings. Note that, in all the drawings, the same reference characters are attached to similar constituent components, and detailed explanation thereof will not be repeated as appropriate.

First Exemplary Embodiment

First, a coil component 40 according to this exemplary embodiment will be described with reference to FIGS. 1 to 5.

The coil component 40 according to this exemplary embodiment includes a core 30 and a coil 10 wound around the core 30. The core 30 is configured to include a plurality of split cores 31 arranged linearly alongside each other in the axial-center direction of the coil 10. An intervening layer made out of a non-magnetic material (for example, comprised of an insulating coating 35 illustrated in FIG. 3) is disposed between split cores 31 adjacent to each other of the plurality of split cores 31.

The "plurality of split cores 31 forming the core 30 is arranged linearly alongside each other in the axial-center direction of the coil 10" means, in other words, that the coil 10 is wound along the axial direction of the core 30.

With the coil component 40 according to this exemplary embodiment, the intervening layer made out of a non-magnetic material is disposed between individual split cores 31 forming the core 30 to reduce the leakage magnetic flux, and hence, it is possible to reduce alternating-current resistance of the coil 10.

The coil component 40 according to this exemplary embodiment can be favorably used as a resonance coil for a field coupling non-contact power supply system, can be used at high frequencies (for example, a band of MHz) and with large electric power (the order of kw or higher), and has a structure that achieves a low loss. In such a resonance coil, the alternating-current resistance due to stray capacity, proximity effect and core loss causes a large loss. However, in the case of this exemplary embodiment, the leakage magnetic flux can be reduced and the skin effect of magnetic flux can be reduced, so that the core loss can be reduced. Thus, it is possible to achieve a resonance coil exhibiting excellent quality factors.

Below, detailed description will be given.

Figure 2:
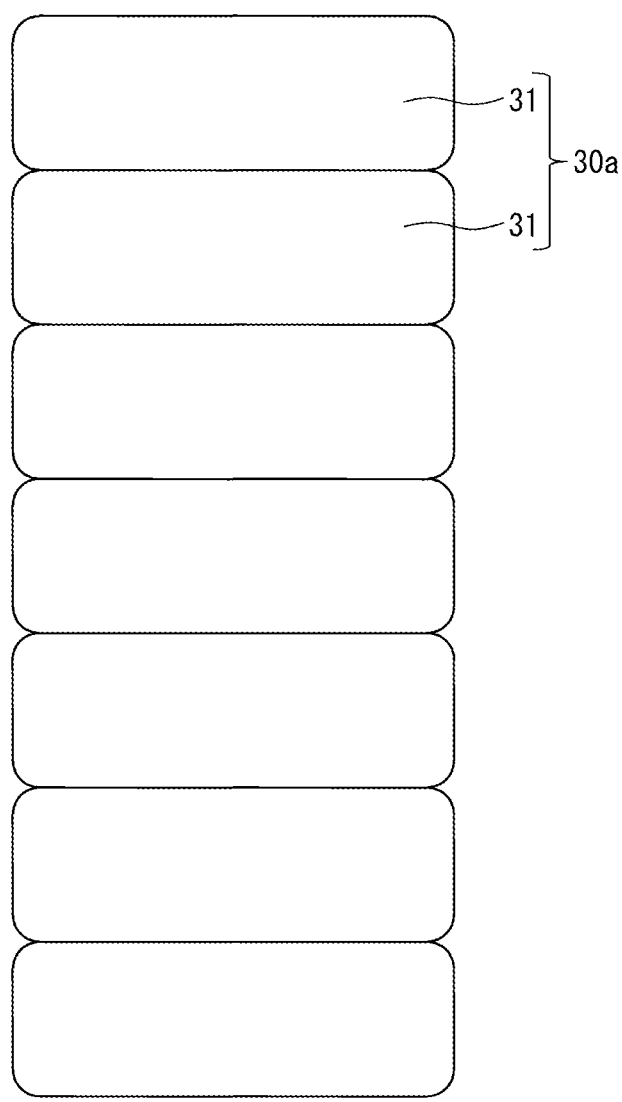
FIG. 2 is an elevation view illustrating the core that the coil component according to the first exemplary embodiment includes.
Figure 3:
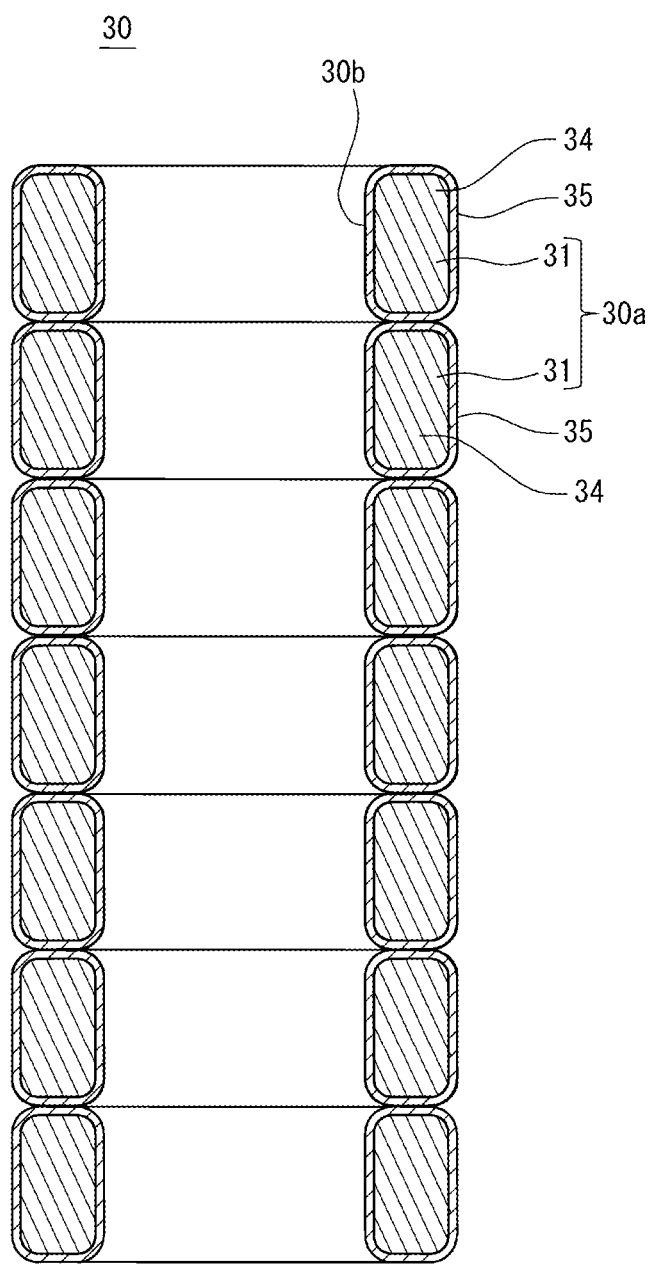
FIG. 3 is a front sectional view illustrating the core that the coil component according to the first exemplary embodiment includes.

As illustrated in any of FIGS. 1 to 3, in the case of this exemplary embodiment, the split cores 31 forming the core 30 are each formed into an annular shape (for example, a circular ring shape).

Figure 5:
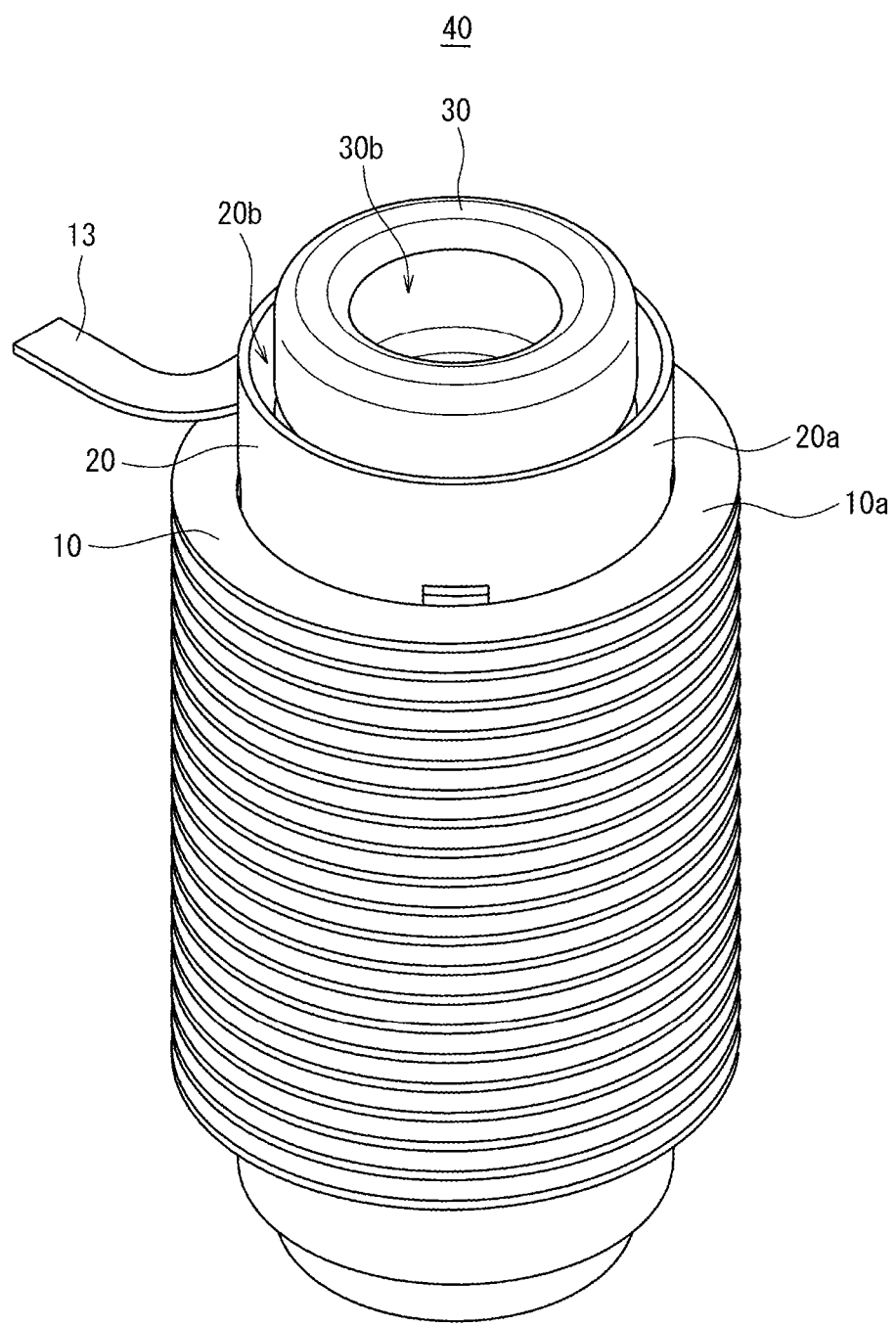
FIG. 5 is a perspective view illustrating the coil component according to the first exemplary embodiment.
Figure 7:
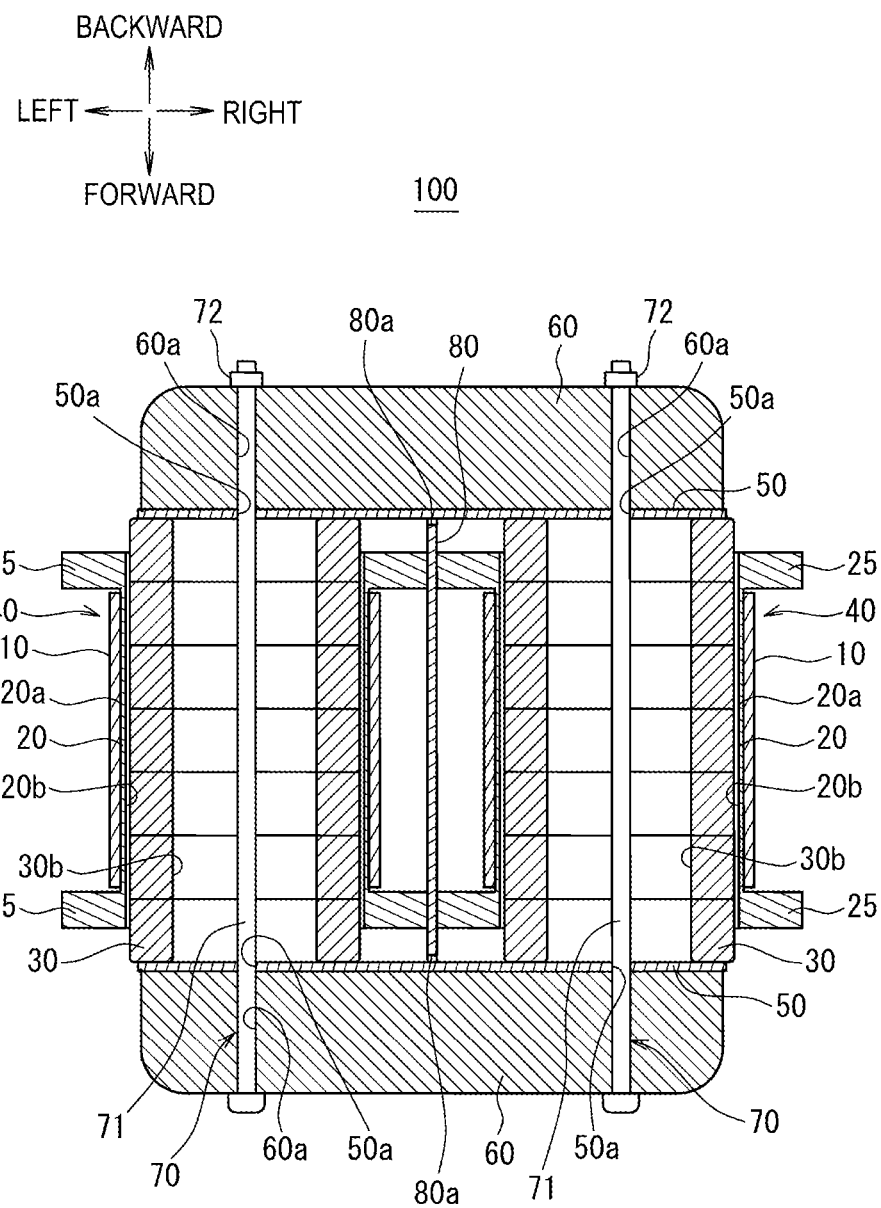
FIG. 7 is a sectional plan view illustrating the coil component unit (coil component) according to the first exemplary embodiment.

In addition, the coil 10 is disposed around the core 30 in a manner such that the axial directions of the split cores 31 align with the axial-center direction of the coil 10 (see FIGS. 5 and 7).

The core 30, which is an assembly of circular ring-shaped split cores 31, is formed into a hollow cylindrical shape.

That is, in the case of this exemplary embodiment, the core 30 is comprised of a tubular core body 30a, and has a cylindrical hollow portion 30b formed inside of the core body 30a.

As illustrated in FIG. 3, a coating (for example, an insulating coating 35) made out of a non-magnetic material is formed on the entire surface of each of the split cores 31. A portion of this coating that faces an adjacent split core 31 forms the above-described intervening layer.

That is, each of the split cores 31 is configured to include a split core body 34 made out of a magnetic material and formed into an annular shape (for example, a circular ring shape), and the insulating coating 35 formed on the entire surface of the split core body 34.

The insulating coating 35 is made out of an insulating material such as a resin.

Furthermore, for example, in each of the split cores 31 (each of the split core bodies 34), peripheral edge portions on both end surfaces of a split core 31 in the axial direction thereof (a peripheral edge portion on the outer peripheral side and a peripheral edge portion on the inner peripheral side) are formed into a chamfering shape. Thus, the outer peripheral surface of the core body 30a (the side circumferential surface of the core body 30a) is constricted at regular intervals in the axial direction of the core 30. On the other hand, the inner peripheral surface of the core body 30a is expanded toward the outer side in the radial direction at regular intervals in the axial direction of the core 30.

However, the present invention is not limited to this example. The outer peripheral surface and the inner peripheral surface of the core body 30a may have a cylindrical shape having the same diameter throughout the entire axial direction of the core 30 (shape without constricted or expanded portion).

Figure 4:
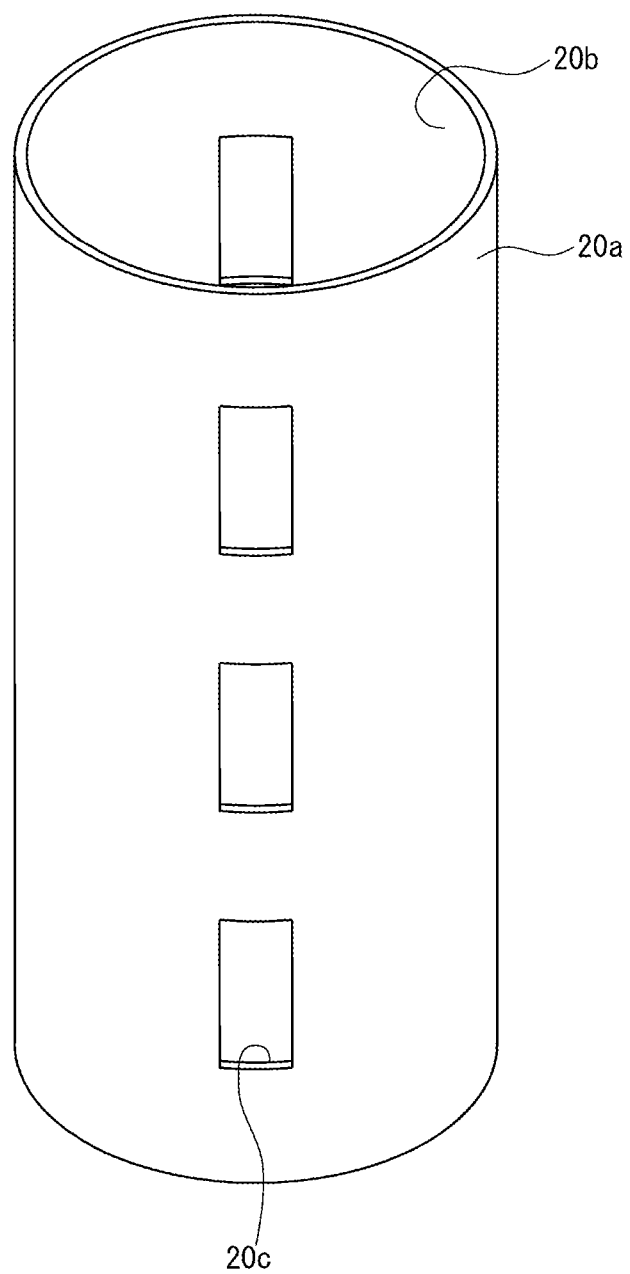
FIG. 4 is a perspective view illustrating a bobbin that the coil component according to the first exemplary embodiment includes.

As illustrated in FIG. 4, the bobbin 20 is comprised of a hollow cylindrical bobbin body 20a. A cylindrical hollow portion 20b is formed inside of the bobbin body 20a.

In the bobbin body 20a, for example, one or a plurality of openings 20c penetrating the inside and the outside of the bobbin main body 20a are formed. That is, the hollow portion 20b, which is the inside space of the bobbing body 20a, and the external space of the bobbin body 20a are communicated with each other through each of the opening 20c.

The bobbin 20 is made out of a resin or other insulating, non-magnetic material.

As illustrated in FIG. 5, the coil 10 is formed by spirally winding a metal wire 10a. The coil 10 has an outwardly extending piece 13 at both ends thereof.

The example illustrated in FIG. 5 gives an example in which the wire 10a is a rectangular wire and the coil 10 is an edgewise coil. However, the wire 10a may be other wire. In addition, the coil 10 may have a structure other than the edgewise coil.

The outer diameter of the core 30 (the outer diameter of the core body 30a) is smaller than the inner diameter of the bobbin 20 (the inner diameter of the bobbin body 20a).

The inner diameter of the coil 10 is larger than the outer diameter of the bobbin 20 (the outer diameter of the bobbin body 20a).

As illustrated in FIG. 5, the coil component 40 is configured by disposing the coil 10 around the bobbin body 20a, and inserting the core 30 into the hollow portion 20b of the bobbin 20.

Figure 6:
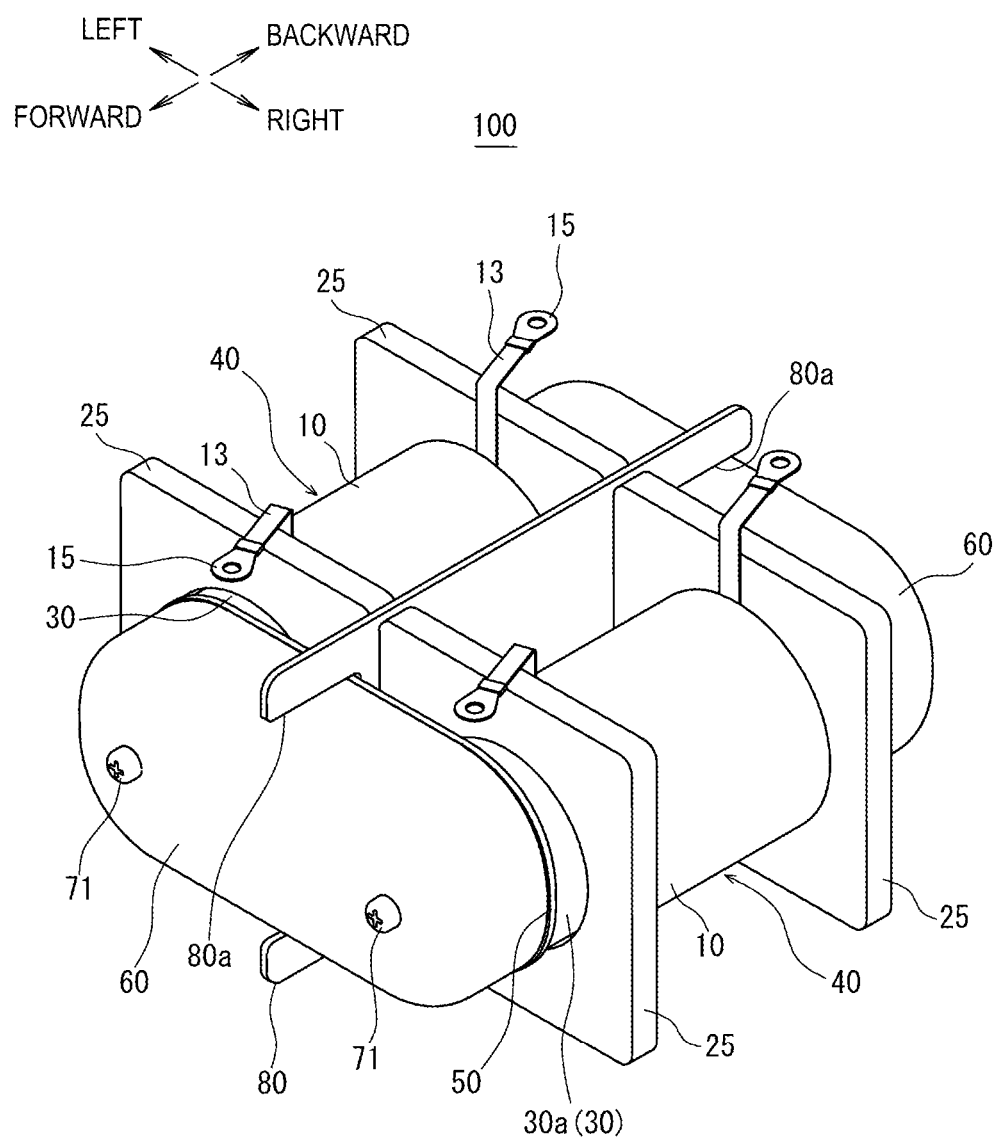
FIG. 6 is a perspective view illustrating a coil component unit (coil component) according to the first exemplary embodiment.

FIGS. 6 and 7 are diagrams each illustrating a coil component unit 100 formed by making plural (for example, two) coil components 40 into a unit. FIG. 6 is a perspective view of the unit, and FIG. 7 is a sectional plan view of the unit. The coil component according to the present invention includes the coil component unit 100.

As for the positional relationship of the coil component unit 100 in each of FIGS. 6 and 7, the directions of forward, backward, left, and right are shown in each drawing. These directions are used only to illustrate the structure of the coil component unit 100, and do not necessarily correspond to the positional relationships of the coil component unit 100 during manufacturing or when in use.

Although any flange portion 25 (see FIGS. 6 and 7) of the bobbin 20 is not illustrated in FIGS. 4 and 5, the bobbin 20 includes a pair of flange portions 25 each provided on both ends of the bobbin body 20a in the axial direction of the bobbin body 20a. These flange portions 25 are each formed into, for example, a square shape or other rectangular shapes.

In addition, as illustrated in FIGS. 5 and 7, in the axial direction of the bobbin body 20a, the longitudinal dimension of the core 30 is longer than that of the bobbin 20, and the end portion of the core 30 protrudes from each of both ends of the bobbin 20.

Here, the two coil components 40 of the coil component unit 100 are arranged in parallel so that the axial directions of bobbin bodies 20a of these coil components 40 extend in parallel to each other.

In addition, a flat plate-like partitioning plate 80 is disposed between the two coil components 40.

In the axial direction of the bobbin body 20a, both ends of the partitioning plate 80 are each provided with a cutout-shaped portion 80a having a shape obtained by cutting out a rectangular-shaped portion from the partitioning plate 80.

As illustrated in FIG. 7, a flat plate-like spacer 50 is disposed at both ends of the coil component 40 in the axial direction of the bobbin body 20a.

In addition, a holding member 60 is disposed at positions located outside of the spacer 50 in the axial direction of the bobbin body 20a (at a position located in front of the forward-side spacer 50 in FIG. 7 and at a position located behind the backward-side spacer 50 in FIG. 7).

That is, the coil component unit 100 includes a pair of spacers 50 and a pair of holding members 60.

Each of the holding members 60 and the spacers 50 is used to fix both of the two coil components 40 that the coil component unit 100 includes.

The spacers 50 and the holding members 60 each have an insertion hole 50a and an insertion hole 60a, respectively, formed therein. A bolt 71 is inserted into the insertion hole 50a and the insertion hole 60a of each of the spacer 50 and the holding member 60, respectively, located at both ends of the coil component 40 and is also inserted into the hollow portion 30b of the core 30. A nut 72 is tightened at the tip end side of the bolt 71. With this configuration, a pair of holding members 60, a pair of spacers 50, and the coil components 40 are fixed to each other with a fastening member 70 including the bolt 71 and the nut 72.

That is, by fastening the bolt 71 and the nut 72 together, both ends of the core 30 are sandwiched by the pair of holding members 60 via the spacers 50, respectively.

This configuration creates a state where the plurality of split cores 31 forming the core 30 are in pressure contact with each other, reducing positional shift of the plurality of split cores 31.

As described above, the coil component unit 100 (coil component) includes the holding member 60 that makes the plurality of split cores 31 in pressure contact with each other by sandwiching both ends of the core 30.

The spacer 50 on one side and a holding member 60 adjacent to this spacer 50 are disposed so as to penetrate through a plate surface of the partitioning plate 80 through the cutout-shaped portion 80a on one side (penetrate in the right and left direction in FIGS. 6 and 7).

Similarly, the spacer 50 on the other side and a holding member 60 adjacent to this spacer 50 are disposed so as to penetrate through a plate surface of the partitioning plate 80 through the cutout-shaped portion 80a on the other side (penetrate in the right and left direction in FIGS. 6 and 7).

In addition, the outwardly extending pieces 13 located at both ends of the coil 10 of each of the coil components 40 are provided with a terminal portion 15 for external connection.

According to the first exemplary embodiment as described above, the intervening layer made out of a non-magnetic material is disposed between the plurality of split cores 31 forming the core 30, and hence, it is possible to reduce alternating-current resistance of the coil 10.

That is, since the core 30 includes plural separating magnetic gaps (magnetic gaps existing between split cores 31), the leakage magnetic flux from the core 30 reduces, which makes it possible to reduce the alternating-current resistance of the coil 10 in a high frequency band.

In the case of this exemplary embodiment, each of the split cores 31 has an annular shape, and the core 30 has a hollow cylindrical shape. Thus, the high-frequency magnetic flux not only passes through the outer peripheral surface of the core 30 but also passes through the inner peripheral surface, which reduces an influence of the skin effect, and hence, it is possible to further reduce the alternating-current resistance.

Second Exemplary Embodiment

Figure 8:
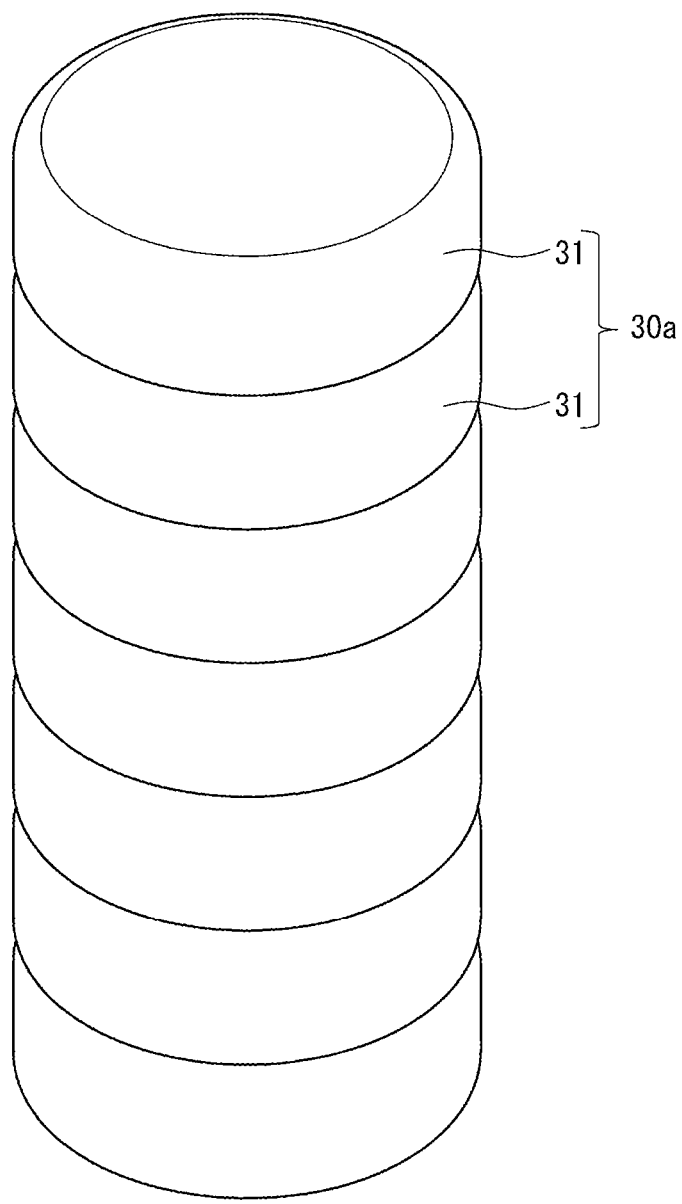
FIG. 8 is a perspective view illustrating a core that a coil component according to a second exemplary embodiment includes.

Next, the second exemplary embodiment will be described with reference to FIGS. 8 and 9.

The coil component according to this exemplary embodiment differs from the coil component 40 according to the first exemplary embodiment in that the split cores 31 forming the core 30 each have a disk shape, and in other points, is configured in a manner similar to the coil component 40 according to the first exemplary embodiment.

Figure 9:
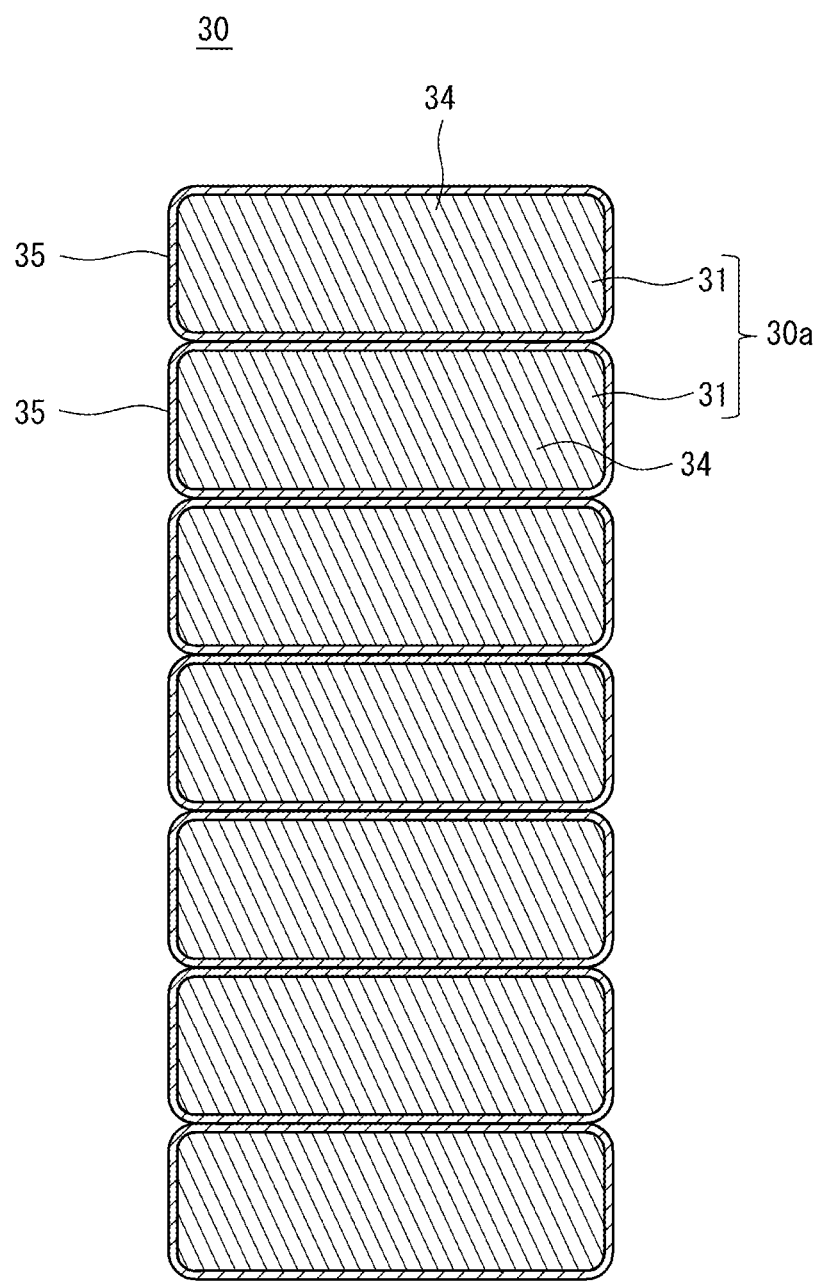
FIG. 9 is a front sectional view illustrating the core that the coil component according to the second exemplary embodiment includes.

That is, as illustrated in FIG. 9, the split core 31 includes a split core body 34 made out of a magnetic material and formed into a disk shape, and an insulating coating 35 formed on the entire surface of the split core body 34.

For example, in each of the split cores 31 (each of the split core bodies 34), peripheral edge portions on both end surfaces of a split core 31 in the axial direction thereof are formed into a chamfering shape. Thus, the outer peripheral surface of the core body 30a (the side circumferential surface of the core body 30a) is constricted at regular intervals in the axial direction of the core 30.

However, the present invention is not limited to this example. The outer peripheral surface of the core body 30a may have a cylindrical column shape having the same diameter throughout the entire axial direction of the core 30 (shape without constricted portions).

The coil component unit according to this exemplary embodiment differs from the coil component unit 100 according to the first exemplary embodiment in that the split cores 31 forming the core 30 each have a disk shape. In addition, the coil component unit according to this exemplary embodiment does not include the fastening member 70. Instead, the coil component unit according to this exemplary embodiment includes a clamp member (not illustrated) disposed around the coil component. With this clamp member, both ends of the core 30 are compressed in the axial direction thereof.

In other points, the coil component unit according to this exemplary embodiment is configured in a manner similar to the coil component unit 100 according to the first exemplary embodiment.

Modification Example

FIG. 10A illustrates a modification example that corresponds to the structure of the first exemplary embodiment described above. FIG. 10B illustrates a modification example that corresponds to the structure of the second exemplary embodiment described above.

As illustrated in FIGS. 10A and 10B, in the case of this modification example, split cores 31 adjacent to each other are made adhere to each other through an adhesive layer 36 made out of a non-magnetic material.

With this configuration, the entire core 30 can keep its unity without both ends of the core 30 being sandwiched.

The adhesive layer 36 is made out of, for example, resin or other insulating, non-magnetic material.

In this modification example, the adhesive layer 36 constitutes the above-described intervening layer.

These are descriptions of exemplary embodiments with reference to the drawing. However, these are merely examples of the present invention, and various configurations other than those described above may be employed. In addition, the exemplary embodiments described above can be combined as appropriate without departing from the main point of the present invention.

This exemplary embodiment includes the following technical ideas.
(1) A coil component including:
  a core; and
  a coil wound around the core, in which
  the core is configured to include a plurality of split cores arranged linearly alongside each other in an axial-center direction of the coil, and
  an intervening layer made out of a non-magnetic material is disposed between split cores adjacent to each other of the plurality of split cores.
(2) The coil component according to (1), in which
  the split cores are each formed into an annular shape, and
  an axial direction of each of the split cores aligns with the axial-center direction of the coil.
(3) The coil component according to (1) or (2), in which
  a coating made out of a non-magnetic material is formed on the entire surface of each of the split cores, and
  a portion of the coating that faces an adjacent split core forms the intervening layer.
(4) The coil component according to any one of (1) to (3), further including
  a holding member that makes the plural split cores in pressure contact with each other by sandwiching both ends of the core.

This application is based on Japanese Patent Application No. 2017-017076, filed on Feb. 1, 2017, the entire content of which is incorporated hereinto by reference.

The invention claimed is:
1. A coil component comprising:
  a core configured by a plurality of split cores;
  an intervening layer disposed between adjacent split cores of the plurality of split cores, the intervening layer being a non-magnetic material;

a coil wound around the core, the plurality of split cores being stacked along an axial-center direction of the coil;

a bobbin disposed between an outer periphery of the core and an inner periphery of the coil, the bobbin being a non-magnetic material, the bobbin having a plurality of through holes therein;

a spacer plate arranged on each side of the core in an axial direction of the bobbin; and a pair of holders respectively disposed at positions outside the spacer plates in the axial direction of the bobbin, wherein an air gap is provided between the outer periphery of the core and an inner periphery of the bobbin, and the plurality of split cores are in pressure contact with each other by sandwiching both sides of the core by the pair of holders via the pair of spacer plates.

2. The coil component according to claim 1, wherein
each of the plurality of split cores is annular, and
an axial direction of each of the plurality of split cores aligns with the axial-center direction of the coil.

3. The coil component according to claim 1, wherein
a coating is formed on an entire surface of each of the plurality of split cores, the coating is a non-magnetic material, and
a portion of the coating that faces an adjacent split core forms the intervening layer.

4. The coil component according to claim 1,
wherein the adjacent split cores are adhered to each other with an adhesive, and the adhesive is a non-magnetic material.

* * * * *